G. S. LEWIS.
ART OF MANUFACTURING FRONT FORKS FOR BICYCLES.
APPLICATION FILED MAY 28, 1919.
1,322,250.
Patented Nov. 18, 1919.
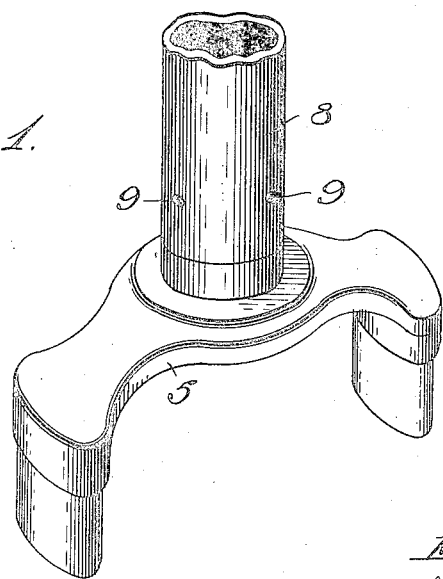
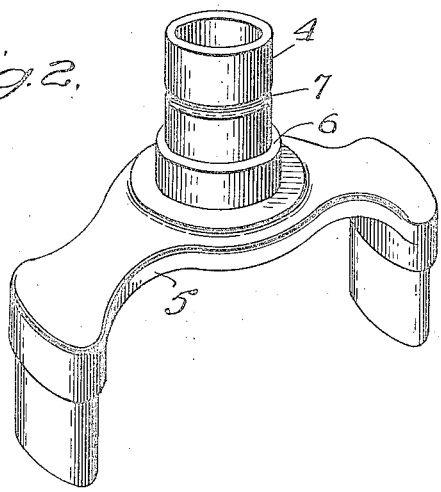
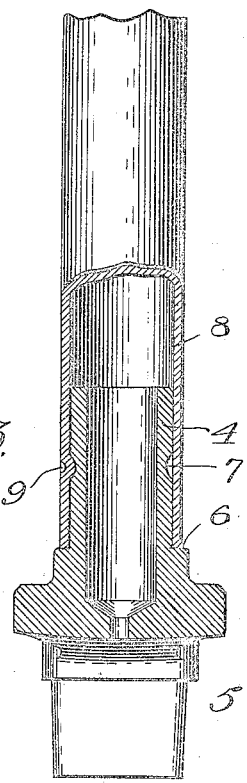
Witnesses:
Inventor:
George S. Lewis,

UNITED STATES PATENT OFFICE.

GEORGE S. LEWIS, OF OAK PARK, ILLINOIS, ASSIGNOR TO MEAD CYCLE COMPANY.

ART OF MANUFACTURING FRONT FORKS FOR BICYCLES.

1,322,250.   Specification of Letters Patent.   Patented Nov. 18, 1919.

Application filed May 28, 1919. Serial No. 300,337.

*To all whom it may concern:*

Be it known that I, GEORGE S. LEWIS, a citizen of the United States, residing at Oak Park, in the county of Cook and State of Illinois, have invented a new and useful Improvement in the Art of Manufacturing Front Forks for Bicycles, of which the following is a specification.

Front forks of bicycles are commonly formed of a fork crown and a fork stem, the crown being formed with an upwardly extending lug and the stem being telescoped with this lug and rigidly secured thereto as by brazing.

The present practice in forming structures of this character is to assemble the stem with the lug of the crown and in order that these parts shall be held together in the proper relative positions for brazing, a pin or rivet is applied to the overlapping portions of these parts, these parts being first drilled to receive the pin or rivet, this practice being objectionable inasmuch as it is expensive.

My object is to reduce the cost of the manufacture of front forks and produce a desirable structure.

Referring to the accompanying drawing, Figure 1 is a broken perspective view of a front fork of a bicycle constructed in accordance with my invention. Fig. 2 is a similar view with the upwardly extending stem portion of the fork removed; and Fig. 3, a view of the side elevation of the fork of the preceding figures with a portion of the structure shown in central longitudinal section.

In carrying out my invention I form in the upwardly extending lug represented at 4, of the fork crown 5, and above the annular shoulder portion 6 at the base of this lug, a groove 7 preferably annular, and in the assembling of the upwardly extending stem portion 8 of the fork, telescope the lower end of this stem portion with the lug 4, the bottom of the stem resting upon the shoulder 6. The metal of the stem portion 8 is then, by any suitable means, deflected inwardly to cause it to extend into the groove 7 and thus become interlocked with the wall of this groove to hold the stem and fork crown in the assembled condition above referred to during the operation of brazing the stem and crown together in accordance with common practice.

The metal of the stem 8 may be deflected into the groove 7 as by striking the metal inwardly at several points, as for example as represented at 9, opposite the groove 7, or if desired, and as suggestive of a variation of the construction shown, the metal of the stem 8 may be spun into the groove 7.

The provision of the groove 7 is of advantage as it may readily be cut in the lug 4, and where the metal of the stem 8 is struck at different points into the groove 7 it permits of this operation being performed quickly as the struck-in portions 9 may be located anywhere around the circle, as distinguished from being required to aline the struck-in portions with relatively small recesses in the lug of the crown.

What I claim as new and desire to secure by Letters Patent is:

1. The art of manufacturing front forks for bicycles which consists in providing in the upwardly-extending lug of the fork-crown, a peripheral elongated groove, telescoping with the lug on the fork-crown the stem-forming tube of the fork, deflecting the metal of the stem into the said groove, and thereupon brazing the structure so assembled.

2. The art of manufacturing front forks for bicycles which consists in providing in the upwardly-extending lug of the fork-crown, a peripheral annular groove, telescoping with the lug on the fork-crown the stem-forming tube of the fork, deflecting the metal of the stem into the said groove, and thereupon brazing the structure so assembled.

GEORGE S. LEWIS.